Patented May 15, 1945

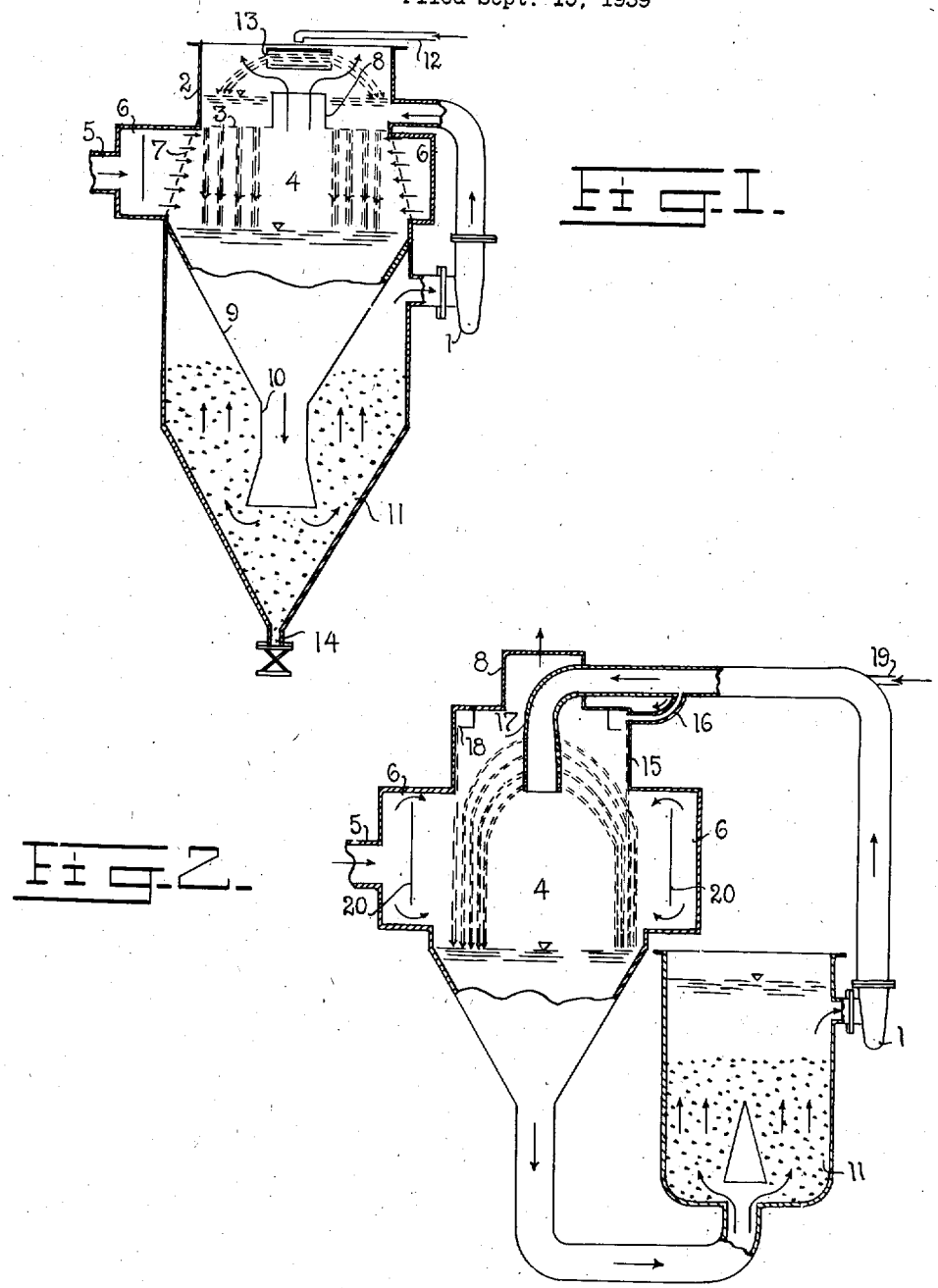

2,375,922

UNITED STATES PATENT OFFICE 2,375,922

TREATMENT OF SOLUTIONS TO OBTAIN SOLID MATTER THEREFROM

Finn Jeremiassen, Oslo, Norway; vested in the Alien Property Custodian

Application September 15, 1939, Serial No. 295,147
In Norway October 5, 1938

5 Claims. (Cl. 23—295)

This invention relates to the treatment of solutions to obtain solid matter therefrom and has for its object a process as well as an apparatus by means of which it is made possible to obtain the separated solid matter in the form of comparatively coarse granules. According to the invention the required increase in the concentration of the treated solution is brought about by contacting the solution with a gas.

It is known that it is possible to increase the concentration of a solution by causing a gas to act on same, by evaporation, cooling or by chemical reaction, for example by the action of a gas containing ammonia, on a liquid containing sulphuric acid, whereby sulphate of ammonia is formed. The means hitherto employed to obtain a large area of contact between liquid and gas have been either to force the gas down into the solution and allowing it to ascend in the form of bubbles, or also to cause the liquid to pass through scrubbers, in the form of cascades or as a rain of jets or drops, downwards through a flowing gas.

When it is desired, however, to carry the concentration so far as to a state of supersaturation, such as is necessary to bring about precipitation of dissolved solids, the means hitherto employed have been found to be practically in applicable because after a short time of operation obstructing coatings are formed on parts of the solid bodies contacting with the supersaturated solution in the gas space.

In the specification of a prior U. S. A. Patent No. 1,478,337 I have mentioned the various advantages which are attainable by operating with degrees of saturation within the metastable limit particularly, when it is desirable to obtain products in the form of coarse granules.

Coarse granular precipitates frequently present several advantages such as a lower cost of centrifugal and drying treatment, higher degree of purity (owing to the fact that the percentage of adhering impure solution is less), decreased formation of dust, decreased agglomerating and caking tendency during storage etc.

In spite of the disclosures in the mentioned U. S. A. patent specification No. 1,478,337 the problem of using a gas to bring about supersaturation in crystalizers has not until now been solved in a satisfactory manner in connection with the manufacture of comparatively large-sized crystals.

Primarily this is due to the difficulties connected with the establishment of a uniform supersaturation, which at no point shall exceed the rather narrow limits of metastable supersaturation. If the flow of liquid through the gas space is slower at some places than at others, parts of the liquid may from this reason happen to be subjected to the supersaturating effect of the gas for too long a time. Most markedly this will take place in connection with splashes causing drops of liquid to adhere to solid bodies in the path of the flowing gas resulting in the formation of finely granular salt and coatings.

I have observed that the main difficulties are due to these circumstances and the present invention is based on this observation.

An important characteristic feature of the process, which is the object of the invention, consists therein that the solution to be concentrated by contact with a gas is introduced into the gas space in an approximately saturated condition and by the action of the gas is caused to be supersaturated to a point within the metastable limits. The supersaturation so produced is thereupon released by contact with crystals of the same substance as that which it is desired to precipitate, whereupon the solution is again returned to the gas space to be again subjected to concentration to a point within the metastable limit of supersaturation.

In the following the invention is described with reference to the accompanying drawing, in which Figs. 1 and 2 diagrammatically illustrate by way of example two types of apparatus adapted to carry the invention into effect.

Referring to Fig. 1 the numeral 1 designates a pump forcing approximately saturated solution up into a container 2, having a bottom provided with holes. The liquid passing through said holes flows freely through the space 4 below said container (2). Through a pipe 5, an annular chamber 6 and openings in a jacket wall 7 a hot gas is forced into the space 4. This brings about evaporation from the surface of the liquid streams or jets which to a greater or less degree will be disrupted so as to form drops. This results in the liquid becoming supersaturated to within the metastable limit, viz. to a degree of supersaturation at which no crystals are formed.

The cooled gas flows out through the pipe 8 as indicated by arrows, while the supersaturated solution collects in the hopper 9, from which it returns to pump 1 through pipe 10 and crystal suspension 11.

In continuous operation fresh solution is constantly supplied to replace evaporated liquid and deposited solids taken up on the crystals in the suspension 11. When this added solution is undersaturated, it may be used to utilize the remaining heat (or chemically active constituents, such as for example ammonia) in the scaping gas by passing the added fresh solution in the most intimate contact possible with the escaping residual gas as diagrammatically illustrated in the drawing. The solution in this example is passed through a pipe 12 down into a cup 13, with holes in the wall or with overflow edge. From this cup the liquid flows downward in such a way that the escaping residual gas from pipe 8 must pass through the "veil" of liquid.

In the case of the volume of added solution being so small that it will be difficult to bring about a uniform distribution of the "veil" over the entire cross sectional area of the container, its volume may be increased by first mixing it with a part of the circulating liquid from the apparatus.

Instead of causing the added undersaturated liquid to fall freely downward, the liquid may also be brought to trickle in cascades or through a scrubber in which the residual gases ascend.

The crystals in the suspension 11 grow as a result of the supersaturation being released on them. The larger ones sink farthest downwards and are continuously or intermittently removed through pipe 14.

In the operation of the described plant no part of the liquid will be subjected to the supersaturating effect of the gas for a too long time, and there are no solid bodies in the path of the particles of liquid, onto which liquid might adhere to form coatings. The only solid body with which the particles of liquid enter into contact while in the flowing gas, viz. the bottom 3, is left by the liquid before there has been time enough to arise any substantial degree of supersaturation. Further the re-supersaturation of the liquid at each cycle is released in the crystal suspension 11, and this means that the total supersaturation at no point will arise above the metastable limit, so that the holes in the bottom 3 will not be obstructed. The fact that the gas flows inwards into space 4 further counteracts splashing from the streams of liquid on to the jacket wall 7 particularly in the case of this latter having been given a tapering form as illustrated, because the spreading or disintegration of the streams or jets into drops will increase the longer the streams have moved downward.

It is also possible to dispense with the jacket 7 because also in this case it is possible to obtain sufficient relative velocities between gas and liquid when there is provided for the production of a strong whirling motion in the gas already before it enters between the streams of liquid.

The process as explained operates with degrees of supersaturations, which are at all points within the metastable limit so that coatings (crusts) on the parts of the apparatus are avoided. This means that the supersaturation per cycle which shall give the entire production, is quite small, usually only a fraction of a percent of the entire contents of salts in the liquid. For this reason very large quantities of circulation must be employed, viz. many times as large as the quantity of liquid added per second through 12. This is an important new feature of the present process, inasmuch as it is only thereby rendered possible to employ a great number of liquid jets in the space 4, i. e. a very large contacting surface between the liquid and the gas without having to resort to the use of spray, or quite thin films of liquid as employed in scrubbers, as this would result in formation of fine salt and coatings caused by the limit of the metastable supersaturation being locally exceeded, as explained above.

The method of causing liquid to fall freely down through the space through which gas is flowing, viz. without solid bodies having at any point a chance to produce injurious local non-uniform motion, is also capable of being carried into effect in other ways than illustrated in Fig. 1.

In Fig. 2 is shown as an example a modified embodiment of the invention. In this case the circulation pump 1 forces the circulating liquid through a pipe 17, provided with holes and into the space 4, through which gas is flowing.

If liquid splashes on the wall 15 of chamber 4 and this splashing is insufficient to maintain the wall moist, the undesirable effects of the splashes can be avoided by constantly causing an auxiliary flow of liquid to wash over the wall 15, so that no part of the wall is alternately dry and wet (which would result in the formation of coatings on the wall). To bring about such continuous washing of the wall one may for example make use of a secondary pipe 16, and an annular slot 18. The main principle on which the present invention is based implies that the circulating quantities of solution, as above explained, are very large, and from this reason the employed "washing" flow of solution does not involve any appreciable decrease in the quantity of solution which is utilized as a shower of streamlets or jets.

Fresh solution is introduced through pipe 19 or for example through 16.

In order to secure a uniform distribution of the gas blown in through pipe 5 and also to obtain comparatively large gas velocities in an inward radial direction in space 4, so that jets of solution from pipe 7 shall not splash on to the walls of the chamber, an annular shield 20 may also be arranged.

It is not necessary to maintain atmospherical pressure in the chamber 4. This space may also be kept under vacuum.

As an example of fields in which the present invention can be adapted may be mentioned—in addition to the manufacture of ammonium salt above described—the crystallization of anhydrous sodium sulphate by forcing hot combustion gases through space 4, so as to cause evaporation of a part of the water in each cycle of the flowing solution.

I claim:

1. Apparatus for treating solutions to precipitate soluble matter therefrom comprising a gas chamber, a liquid distributing device at the top of said gas chamber and so arranged as to cause a shower of liquid to fall freely through the gas chamber, a gas supply jacket surrounding the said gas space chamber, the wall between the jacket and the gas chamber having holes to allow gas from the jacket space to pass into the said gas chamber as inwardly directed streams, an exit opening for residual gas being arranged at a central point in relation to the liquid distributing device means for passing a gas into said supply jacket, through said holes and through said gas chamber to said exit, said gas being adapted to produce supersaturation of said liquid within the metastable limit, a crystallizing chamber, means for passing said supersaturated liquid through said crystallizing chamber and means for recycling the liquid from said crystallizing chamber to said liquid distributing device.

2. A crystallizing apparatus comprising a crystallizing chamber and a superimposed gas chamber, disturbing means for causing jets of a solution of a material to be crystallized to pass through said gas chamber, means for collecting the gasified solution and for passing it into said crystallization chamber, a gas supply jacket surrounding said gas chamber and separated therefrom by a wall, said wall being provided with perforations adapted to permit gas from the jacket to pass into the gas chamber in an inwardly directed stream, said wall having the form of an upwardly tapering cone.

3. A crystallizing process which comprises passing a substantially saturated salt solution containing a reagent in a freely falling shower through an open, unobstructed zone in such manner that the shower of solution is surrounded by a gas space, passing a gas inwardly from said gas space into said zone and upwardly in counter-current to said shower, said gas being reactive with the reagent in solution to produce a supersaturated solution of a salt, then passing said supersaturated solution thus produced upwardly through a suspension of crystals of the salt so produced, thereby releasing the supersaturation of said solution and causing crystallization of said salt on said suspended crystals, separating the resulting crystals from the solution and recycling the latter to said shower.

4. A crystallizing process which comprises passing a substantially saturated solution of a crystalline compound in a freely falling shower through an open, unobstructed concentrating zone in such manner that the shower of solution is surrounded by a gas space, passing a gas inwardly from said gas space into said zone and upwardly in counter-current to said shower, said gas being adapted to produce an increase in concentration of said solution to produce supersaturation thereof, then passing said supersaturated solution upwardly through a suspension of crystals of said compound of a size such that the crystals tend to fall through said solution by gravity, thereby releasing said supersaturation and causing crystallization of said compound on said crystals, separating the resulting crystals from the solution and recycling the latter to said shower.

5. Apparatus for treating saturated solutions to precipitate crystallizable matter therefrom comprising an open concentrating chamber, a solution distributing device at the top of said chamber having a plurality of openings in the bottom thereof for the passage of the solution therethrough in a shower to fall freely through the chamber, a gas supply comprising a jacket having a wall surrounding the said chamber, the wall between the jacket and the chamber having openings adapted to allow the gas to pass from the jacket into the said gas chamber through said shower as inwardly directed streams the wall being so positioned with respect to the said solution distributing device that the shower of falling solution does not contact said wall, a crystallizing chamber for containing a suspension of crystals of said crystallizable matter therein and means including a pump for passing said supersaturated solution through said suspension whereby crystallization of said solution on said suspended crystals takes place.

FINN JEREMIASSEN.

CERTIFICATE OF CORRECTION.

Patent No. 2,375,922. May 15, 1945.

FINN JEREMIASSEN.

It is hereby certified that error appears in the printed specification of the above numbered patent requiring correction as follows: Page 2, second column, line 40, for "pipe 7" read --pipe 17--; page 3, first column, line 5, claim 2, for "disturbing" read --distributing--; and that the said Letters Patent should be read with this correction therein that the same may conform to the record of the case in the Patent Office.

Signed and sealed this 21st day of August, A. D. 1945.

Leslie Frazer (Seal) First Assistant Commissioner of Patents.

crystallizing chamber to said liquid distributing device.

2. A crystallizing apparatus comprising a crystallizing chamber and a superimposed gas chamber, disturbing means for causing jets of a solution of a material to be crystallized to pass through said gas chamber, means for collecting the gasified solution and for passing it into said crystallization chamber, a gas supply jacket surrounding said gas chamber and separated therefrom by a wall, said wall being provided with perforations adapted to permit gas from the jacket to pass into the gas chamber in an inwardly directed stream, said wall having the form of an upwardly tapering cone.

3. A crystallizing process which comprises passing a substantially saturated salt solution containing a reagent in a freely falling shower through an open, unobstructed zone in such manner that the shower of solution is surrounded by a gas space, passing a gas inwardly from said gas space into said zone and upwardly in counter-current to said shower, said gas being reactive with the reagent in solution to produce a supersaturated solution of a salt, then passing said supersaturated solution thus produced upwardly through a suspension of crystals of the salt so produced, thereby releasing the supersaturation of said solution and causing crystallization of said salt on said suspended crystals, separating the resulting crystals from the solution and recycling the latter to said shower.

4. A crystallizing process which comprises passing a substantially saturated solution of a crystalline compound in a freely falling shower through an open, unobstructed concentrating zone in such manner that the shower of solution is surrounded by a gas space, passing a gas inwardly from said gas space into said zone and upwardly in counter-current to said shower, said gas being adapted to produce an increase in concentration of said solution to produce supersaturation thereof, then passing said supersaturated solution upwardly through a suspension of crystals of said compound of a size such that the crystals tend to fall through said solution by gravity, thereby releasing said supersaturation and causing crystallization of said compound on said crystals, separating the resulting crystals from the solution and recycling the latter to said shower.

5. Apparatus for treating saturated solutions to precipitate crystallizable matter therefrom comprising an open concentrating chamber, a solution distributing device at the top of said chamber having a plurality of openings in the bottom thereof for the passage of the solution therethrough in a shower to fall freely through the chamber, a gas supply comprising a jacket having a wall surrounding the said chamber, the wall between the jacket and the chamber having openings adapted to allow the gas to pass from the jacket into the said gas chamber through said shower as inwardly directed streams the wall being so positioned with respect to the said solution distributing device that the shower of falling solution does not contact said wall, a crystallizing chamber for containing a suspension of crystals of said crystallizable matter therein and means including a pump for passing said supersaturated solution through said suspension whereby crystallization of said solution on said suspended crystals takes place.

FINN JEREMIASSEN.

CERTIFICATE OF CORRECTION.

Patent No. 2,375,922. May 15, 1945.

FINN JEREMIASSEN.

It is hereby certified that error appears in the printed specification of the above numbered patent requiring correction as follows: Page 2, second column, line 40, for "pipe 7" read --pipe 17--; page 3, first column, line 5, claim 2, for "disturbing" read --distributing--; and that the said Letters Patent should be read with this correction therein that the same may conform to the record of the case in the Patent Office.

Signed and sealed this 21st day of August, A. D. 1945.

Leslie Frazer (Seal) First Assistant Commissioner of Patents.